United States Patent Office.

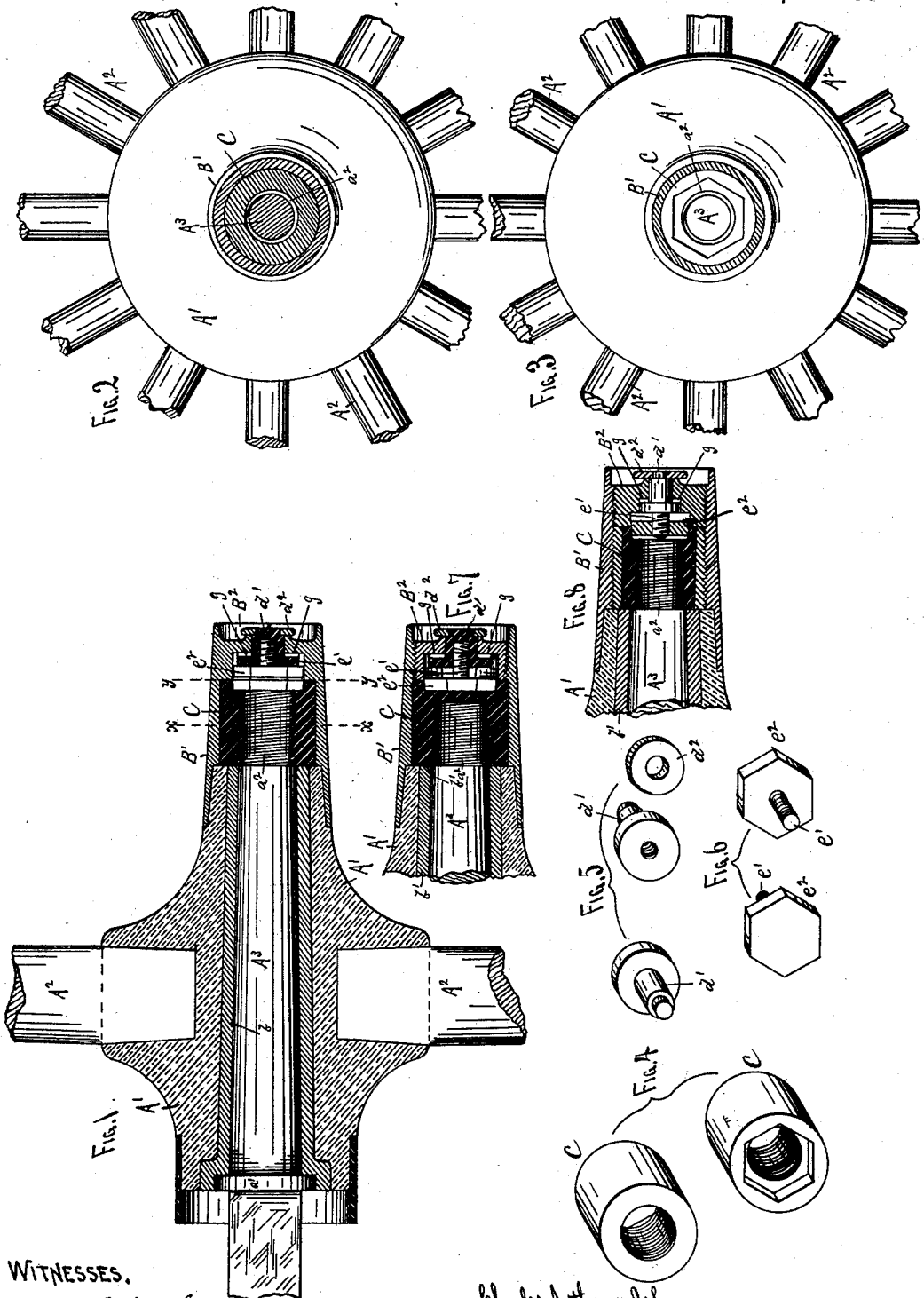

CHARLES ANTHONY JOHNSON, OF ST. PAUL, MINNESOTA, ASSIGNOR OF ONE-HALF TO CARL HERMAN VON STOCKENSTROM, OF SAME PLACE.

FASTENING DEVICE FOR VEHICLE-HUBS.

SPECIFICATION forming part of Letters Patent No. 336,520, dated February 16, 1886.

Application filed December 2, 1885. Serial No. 184,521. (No model.)

*To all whom it may concern:*

Be it known that I, CHARLES ANTHONY JOHNSON, a subject of the King of Norway and Sweden, who have declared my intention of becoming a citizen of the United States, residing at St. Paul, Ramsey county, Minnesota, have invented certain new and useful Improvements in Vehicle-Hubs, of which the following is a specification.

In the drawings, Figure 1 is a sectional view through the hub of a wheel longitudinally. Fig. 2 is a cross-section on the line $x\,x$ of Fig. 1. Fig. 3 is a cross-sectional view on the line $y\,y$ of Fig. 1. Fig. 4 represents two views of the axle-nut in perspective. Figs. 5 and 6 represent detached perspective views of the different parts of the nut-locking mechanism. Figs. 7 and 8 represent sections of the outer ends of the hub, illustrating modifications of the construction.

A' represents the main body portion of the hub; A², the spokes, and A³ the axle, the latter having the usual collar, $a'$, and screw-thread $a^2$, while the hub is provided with the skein $b'$. On the outer end of the hub A' is secured a ferrule, B', in which a cylindrical nut, C, is adapted to run, the nut fitting upon the screw end $a^2$ of the axle A³, as shown. The ferrule B' is shown with a closed end, B², through the center of which a stud, $d'$, is journaled, the stud having a milled edged disk, $d^2$, outside the ferrule, by which it may be turned from the outside. The stud $d'$ is provided with an internal screw-thread, in which a screw-stud, $e'$, on a hexagonal plate or disk, $e^2$, fits, so that the revolution of the stud $d'$ will cause the hexagonal plate to be moved inward and outward toward and away from the cylindrical nut C, as required. The outer end of the cylindrical nut is provided with a cavity corresponding to the hexagonal disk $e^2$, so that when the stud $d'$ is revolved by the disk $d^2$ in one direction, the disk $e^2$ will be forced into the cavity in the nut, and thus lock the nut fast to the ferrule, the interior of the ferrule B', opposite the edges of the disk $e^2$, being hexagonal to correspond therewith.

A rubber washer, $g$, will be inserted between the stud $d'$ and the outer ends, B², of the ferrule to form a packing between the stud and ferrule to prevent the escape of oil or the entrance of dust or sand.

In Figs. 7 and 8 some slight modifications of the construction are shown.

In Fig. 1 the two parts B' B² of the ferrule are shown in one single piece of metal, while in Figs. 7 and 8 the part B² is shown formed in a separate piece and screwed into the part B'.

In Fig. 7 the part B² is shown extending only to the outer end of the nut C, while in Fig. 8 the part B² is shown extending to the rear of the nut, so that the latter revolves in the part B², instead of in the ferrule, as in Figs. 1 and 7; but the construction and mode of operation are substantially the same in all three of the forms shown.

If the construction shown in Fig. 1 is used, the nut C will be placed in the ferrule B' before the latter is attached to the hub A'; but if either of the methods of construction shown in Figs. 7 or 8 is used, the nut may be inserted before the part B² is screwed in. The disk $d^2$ will then be revolved until the hexagonal plate $e^2$ is set into the cavity in the nut C, as shown in Fig. 7, which will firmly fix and hold the nut in the ferrule, and consequently hold the nut fixed into the hub, so that the wheel, when placed upon the axle-journal and revolved, will cause the screw $a^2$ to enter the nut and thus secure the hub to the axle. The disk $d^2$ is then turned backward, which will run the hexagonal disk $e^2$ out of the cavity in the nut C, as in Fig. 1, so that the hub is left free to revolve around the nut and axle-journal, the nut remaining fixed to the axle in the ordinary manner. Then when it is desired to remove the wheel to oil the axle-journal or for any other purposes, it is only necessary to set the disk $e^2$ into the cavity in the nut C by turning the disk $d^2$ and then revolving the wheel backward to run the screw-thread $a^2$ out of the nut C. The wheel may then be laid down on one side and a quantity of oil poured into the hub, and the wheel replaced on the axle-journal, as before. One great advantage of this arrangement is that no oil can escape from the outer end of the hub to soil the clothing of the person getting into or out of the vehicle, or being wasted by running out of the hub.

I have shown the plate $e^2$ "hexagonal;" but I do not wish to be confined to that precise form, as I am aware that almost any irregular form of disk may be used.

In Fig. 8 the screw-stud $e'$ is shown on the stud $d'$, while the internal screw-thread into which it fits is shown in the disk $e^2$, instead of in the stud $d'$; but the functions and mode of operation are the same in both constructions.

Having thus described my invention, what I claim as new is—

1. In a vehicle-wheel, the combination, with the axle-journal $A^3$, hub $A'$, and nut C, of a ferrule, $B' B^2$, supporting an irregular disk or plate, $e^2$, adapted to be connected to and disconnected from said nut from outside said ferrule, substantially as set forth.

2. The combination of hub $A'$, axle-journal $A^3$, nut C, having irregular cavity in its outer end, ferrule $B' B^2$, disk $e^2$, having irregular periphery corresponding to the irregular cavity in said nut, stud $d'$, journaled in said ferrule $B' B^2$, and means, substantially as described, whereby the revolution of said stud will cause said disk $e^2$ to be connected to or disconnected from said nut C.

In testimony whereof I have hereunto set my hand in the presence of two subscribing witnesses.

CHARLES ANTHONY JOHNSON.

Witnesses:
C. N. WOODWARD,
H. S. WEBSTER.